United States Patent [19]

Lupo

[11] 4,434,864

[45] Mar. 6, 1984

[54] ROOF BOLTER VEHICLE AND WHEELS THEREFOR

[76] Inventor: Frank V. Lupo, 790 W. Price River Dr., Price, Utah 84501

[21] Appl. No.: 348,747

[22] Filed: Feb. 16, 1982

[51] Int. Cl.³ .................. B60B 15/00; B60C 7/24; B62D 11/00

[52] U.S. Cl. .................. 180/6.2; 152/310; 152/330 RF; 152/406; 152/DIG. 10; 301/63 R

[58] Field of Search ............... 180/6.2, 6.28, 6.48, 180/6.5, 6.64, 6.66, 6.7; 152/410, 310, 311, 330 RF, 406, 407, DIG. 10; 301/63 R

[56] References Cited

U.S. PATENT DOCUMENTS

| | | | |
|---|---|---|---|
| 2,884,984 | 5/1959 | Riggs | 152/410 |
| 3,022,810 | 2/1962 | Lambe | 152/310 X |
| 3,052,311 | 9/1962 | Leedom | 180/6.66 |
| 4,058,152 | 11/1977 | Beck et al. | 152/310 |
| 4,088,372 | 5/1978 | Jewett et al. | 301/63 R |
| 4,174,013 | 11/1979 | Yago | 180/6.2 |

FOREIGN PATENT DOCUMENTS

| | | | |
|---|---|---|---|
| 1480847 | 3/1969 | Fed. Rep. of Germany | 152/406 |
| 2648022 | 5/1978 | Fed. Rep. of Germany | 152/310 |
| 305533 | 10/1929 | United Kingdom | 152/406 |

Primary Examiner—Joseph F. Peters, Jr.
Assistant Examiner—Mitchell J. Hill
Attorney, Agent, or Firm—Mallinckrodt & Mallinckrodt

[57] ABSTRACT

A roof-bolting machine of Lee-Norse Model No. TDI-43 type is equipped with wheels having rims constructed to receive significantly wider than normal, tubeless tires forced into unusually tight relationship therewith and with respective O-rings provided therein so as to resist slipping when filled with a foamed plastic rather than air and so as to reduce normally required repairs to the vehicle.

7 Claims, 5 Drawing Figures

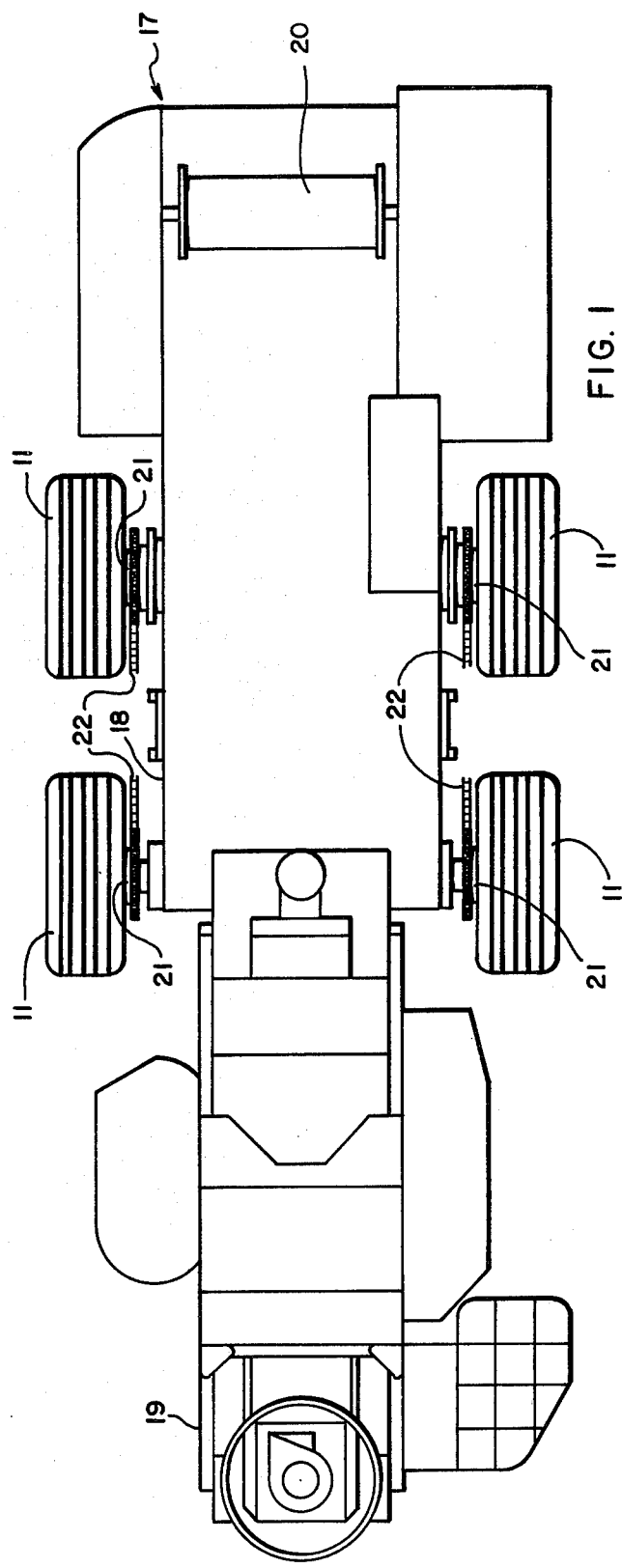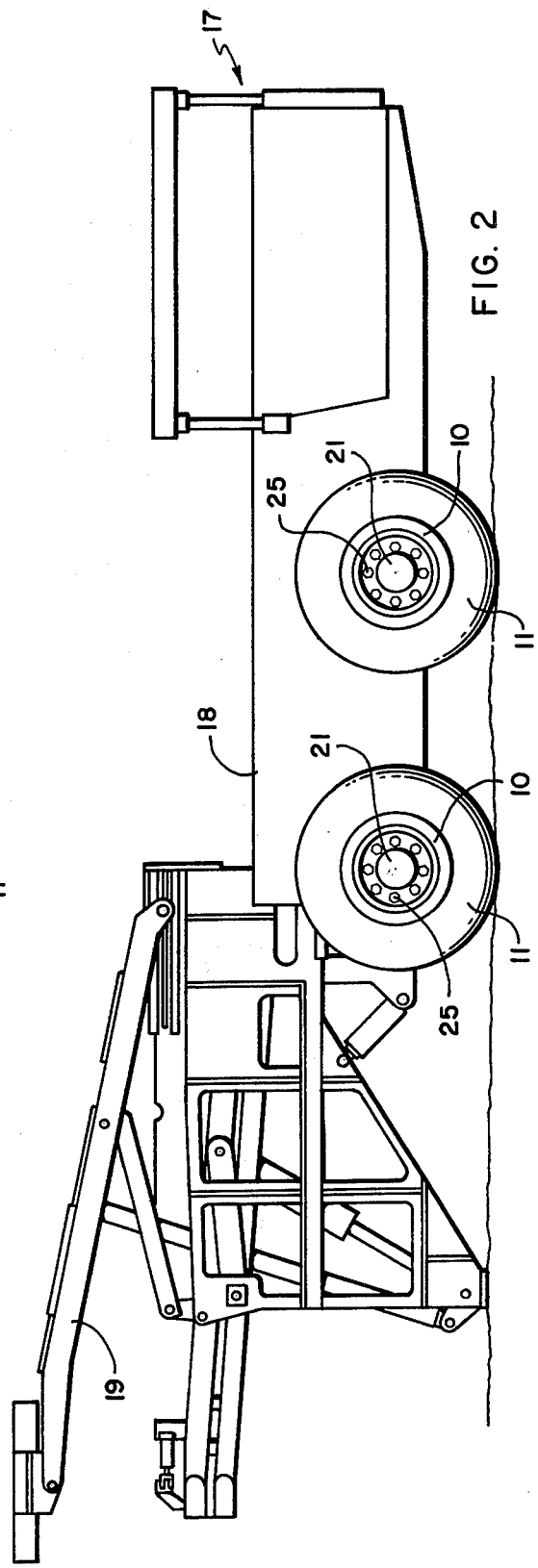

ROOF BOLTER VEHICLE AND WHEELS THEREFOR

BACKGROUND OF THE INVENTION

1. Field

The invention is in the field of rubber-tired wheels for and in combination with industrial vehicles known as "roof bolters" as used in underground mines to drill holes and secure anchoring bolts in the roofs of mining and haulage drifts and tunnels to prevent accidental detachment and falling of overhanging slabs of the natural roof material.

2. State of the Art

Roof bolters are heavy, cumbersome vehicles having elongate chassis frames. The frame of such a vehicle is supported on four wheels mounted amidships and at opposite sides of the vehicle. A boom and cradle assembly is cantilevered forwardly of the front wheels, and a cable reel and drive mechanism rearwardly of the rear wheels. This results in an elongated vehicle with a short wheel base and extensive projections cantilevered at the front and rear ends. The wheels are individually secured to respective stub axles, which are journaled in the frame, and have respective sprocket and sprocket chain drives. The front wheels are fixed against being turned from side-to-side and are separately driven for steering purposes.

A typical roof bolter of this type is normally provided with 7.50×15 tires on fifteen inch diameter wheels having overall rim width of substantially eight and three-eighths inches, as original equipment. The full weight of the vehicle is thus borne by the seven and one-half inch width of the tires, so that the load per square inch of tread is high. Since the environment in which the wheels operate is very demanding, i.e. uneven, rough ground surface frequently strewn with lumps of ore or coal, depending upon the type of mine, careless handling, sudden starts and stops, jagged tunnel walls which tear the side walls of the tires, and twisting of the tires on the wheels as the vehicle is turned, make the effective life of these tires extremely short, e.g. on the order of one month or six weeks.

Efforts have been made to extend the lives of the tires and to minimize downtime by inflating them with a foamed plastic instead of air. However, due to the stress of the operating environment, the tires and the foam filler tend to slip and rotate on the wheels unles the foam is blown into the tire to a pressure of approximately 130 p.s.i. This over-inflation of the tires avoids relative slippage between the tires and wheels, but does not significantly extend the effective lives of the tires. In addition, at a pressure of 130 p.s.i., the foam-filled tires are like solid rubber tires, with litte or no give or compressibility. The result is that the tires do not effectively cushion the shocks from the rough, uneven, ground surface, but transmit them directly to the axles and thence to the vehicle frame, with consequent damage to the vehicle and the equipment mounted thereon. The amount of time during which the vehicle is out of serive due to tire damage or damage to the sprocket drives, axles, and other components has thus been inordinately large, and the expense of tire replacement, vehicle repair, and down time of the vehicle has been exhorbitant.

SUMMARY OF THE INVENTION

In accordance with the present invention, wheels with wider rims and with tires that are oversize relative to the rims are employed. On each wheel, the mounting beads of the tire are forced into place during mounting of the tire on the undersized rim so as to fit unusually tightly. When inflated with foamed plastic to a pressure of only about 100 psi, the tire beads are pressed against the side flanges of the rim so tightly as to effectively resist slipping on the wheel.

Additionally, the rim is provided with a sealing O-ring adjacent to the separable mounting ring that provides one of the side flanges of the rim. It is exposed to the corresponding tire bead so as to be tightly pressed by such tire bead in direct sealing relationship therewith.

An annular mounting plate for attaching the wheel to the hub of one of the stub axles of the vehicle is secured interiorly of the rim, off center inwardly of the width of the rim so as to mount the wheel with its excess width facing outwardly of the vehicle.

It has been found that tire life is extended many times, that a stable, impact-absorbant support is provided for the vehicle, and that breakage of sprocket chains is considerably reduced, as is damage to other parts of the vehicle and the equipment carried thereby. Almost complete elimination of extended downtime, which has been usual in the past, adds to the savings in operating costs otherwise obtained by the inention.

THE DRAWING

The best mode presently contemplated of carrying out the invention will be understood from the detailed description of the embodiment illustrated in the accompanying drawings, in which:

FIG. 1 is a top plan view schematically illustrating a usual type of roof bolter vehicle equipped with the novel wheels of the invention;

FIG. 2 is a side elevation of the same vehicle;

Figure 3:
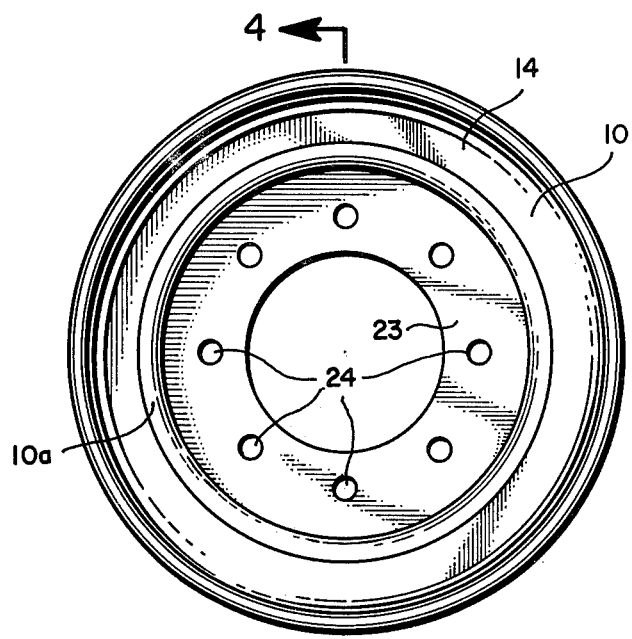
Figure 4:
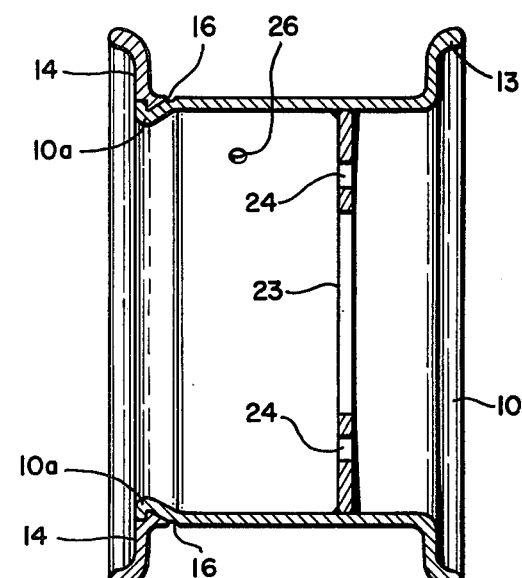

FIG. 3 an elevational view of one of the wheels of the vehicle drawn to a larger scale and minus the tires;

FIG. 4 a view in vertical section taken along the line 4—4 of FIG. 3; and

Figure 5:
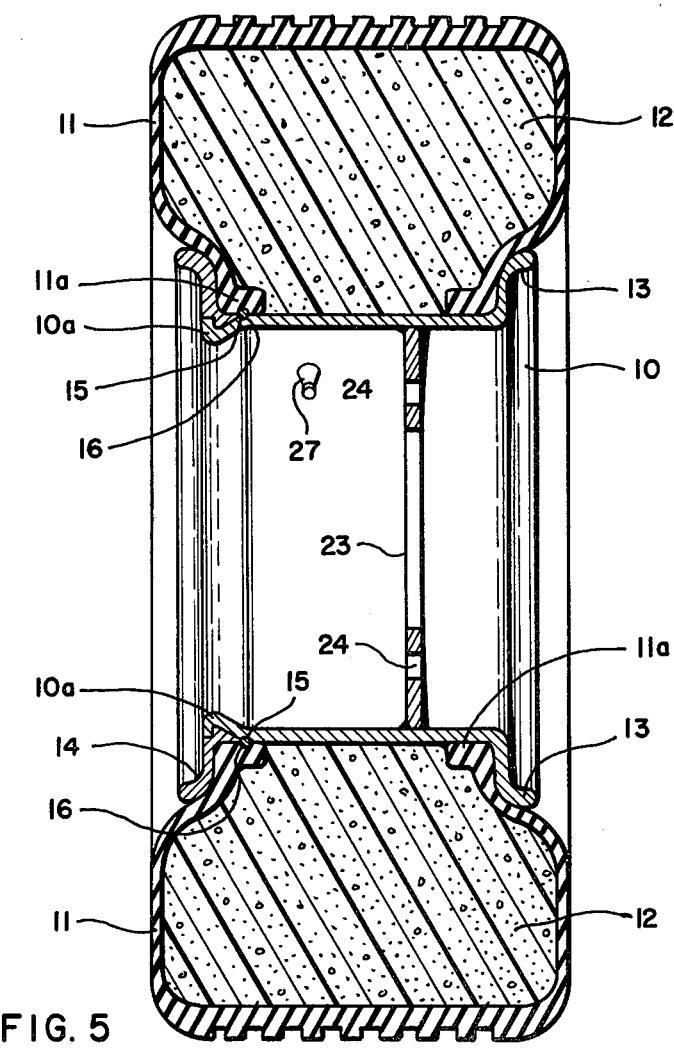

FIG. 5, a corresponding view showing the wheel with the oversize tire mounted thereon.

DETAILED DESCRIPTION OF THE ILLUSTRATED EMBODIMENT

As illustrated in FIGS. 3–5, a wheel according to the present invention includes a circular rim 10, which has an overall width of substantially twelve inches instead of the normal eight and three-eights inches, and a tubeless tire 11, FIG. 3, of size 14.50×15 rather than the usual tube tire of size 7.50×15. It is to be noted that tire 11 is oversize for rim 10, and that, instead of being inflated with air, as is the usual tube tire, it is inflated with a plastic foam 12 of the type customarily used in tires of certain underground mining vehicles. Preferably, the tire 11 has an overall diameter of thirty-two inches.

Rim 10 has an integral peripheral flange 13 at preferably the inside face thereof and a circular formation 10a at preferably the outside face thereof for securing a tire mounting ring 14 as an opposite peripheral flange. Such rim also has a circular groove 15 adjacent to formation 10a for receiving an O-ring 16, which is directly covered and pressed by the corresponding bead portion 11a of a tire 11 for sealing purposes.

Since tire 11 is oversize for rim 10, its bead portions 11a press outwardly against the rim flanges 13 and 14 unusually tightly. The resulting rubber-tired wheels also serve to stabilize operation of roof-bolter vehicle 17 when installed thereon and to better resist tire damage under the difficult conditions of vehicle operation.

Roof-bolter vehicle 17, FIGS. 1 and 2, is of standard, signel boom type as produced by Lee-Norse Company, Pittsburg, Pennsylvania, under its trade designation Model No. TDI-43. It has an overall length of about twenty feet and an overall width of about six feet, with a chassis frame 18 having cantilvered extensions forwardly and rearwardly on which are mounted a roof-bolting boom 19 and a cable spool 20, respectively, among other heavy operating equipment. Approximately amidships of the vehicle as so-constructed, and journaled in chassis frame 18, are front and rear sets of stub axles 21, FIG. 1, having respective sprocket and sprocket chain drives 22. The axles of each set extend transversely of the chassis frame at respectively opposite sides thereof, and the front axles are fixed against turning from side-to-side. Steering is accomplished by driving one of the front axles faster than the other.

The rubber-tired wheels of FIGS. 1-3 are fastened to externally-projecting hubs of the axles, respectively. For this purpose, the rim 10 of each wheel is provided with an annular, axle-hub-attachment-plate 23 secured as by welding internally of the rim off-center therein at approximately normal spacing from the outer periphery of the inside of peripheral flange 13, so the considerably wider than normal wheel will have appropriate operating leeway relative to the corresponding side of the vehicle and sprocket drive. This normal spacing is about three and five-eighths inches.

It can be seen, then, that both the rim 10 and the tire 11 of each wheel extend considerably farther laterally of the vehicle from the corresponding axle hub than do the normal rim and tire of the usual wheel wherein the rim has typically an overall width of eight and three-eighths inches and the axle-hub-attachment plate is about at the midpoint of the tire-receiving recess of the rim which is seven inches wide in comparison with a ten inch width for the corresponding recess of the rim 10 herein.

As in the normal wheel, axle-hub-attaching plate 23 is provided with bolt holes 24 for receiving bolts 25, FIG. 2, to fixedly secure the wheels of the invention to the hubs of the stub axles 21.

For purposes of foam introduction, an opening 26 is provided for insertion of the usual tubless tire valve stem 27.

Use of the term "rubber-tired" herein is intended to include all elastomeric materials that may be used in the production of tires for vehicles.

Whereas, this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. In combination with a roof-bolter vehicle for use in underground mines, which vehicle has an elongate chassis frame, front and rear sets of stub axles extending transversely of and substantially amidships the frame and providing wheel-mounting hubs laterally of the frame, and sprocket wheel and chain drive means for said axles, whereby steering of the vehicle is accomplished by driving one of the front wheels faster than the other, the features of unusually wide, rubber-tired wheels mounted on the axle hubs, respectively, each of said wheels comprising a wider than normal, circular, tire-mounting rim having overall width of substantially twelve inches and an integral peripheral flange at one side thereof; means securing a removable mounting ring as a peripheral flange at the other side thereof; a circular groove for receiving an O-ring adjacent to the mounting-ring-securing-means so as to be directly covered by the corresponding bead of a mounted, oversize tire; an axle-hub-attachment plate secured within the rim off-center inwardly thereof toward the inside peripheral flange of the rim, so as to be at substantially the normal spacing from the inside, peripheral flange of the rim; an O-ring positioned in said groove; a 14.50×15 tubeless tire, oversize for said rim, mounted on said rim and bearing unusually tightly against said rim flanges, with the bead thereof that corresponds to the O-ring directly covering and bearing against said O-ring; a plastic foam inflating said tires; and fastening means fixedly securing the axle-hub-attachment plate of each wheel to the hub of its corresponding axle of the vehicle.

2. A combination according to claim 1, wherein the tires are each 32 inches in overall diameter.

3. A combination according to claim 1, wherein the distance from the outer periphery of the inside peripheral flange to the axle-hub-attachment-plate of each wheel is about 3 and ⅝ths inches.

4. An improved wheel particularly adapted for use with a roof-bolting vehicle as described herein, comprising a circular, tire-mounting rim substantially twelve inches in overall width with an integral peripheral flange at one side thereof; means for securing a removable mounting ring as a peripheral flange at the other side thereof; a circular groove for receiving an O-ring adjacent to the mounting-ring-securing-means so as to be directly covered by the corresponding bead of a mounted, oversize tire; an axle-hub-attachment plate secured within the rim, off-center inwardly thereof toward the inside peripheral flange of the rim so as to be at substantially the normal spacing from the inside, peripheral flange of the rim for use with the said roof-bolting vehicle; an O-ring positioned in the groove; a 14.50×15 tubeless tire, oversize for said rim, mounted on said rim so as to bear unusually tightly against the rim flanges and directly against said O-ring; and a plastic foam inflating said tire for use.

5. A wheel according to claim 4, wherein the tire is 32 inches in overall diameter.

6. A wheel according to claim 4, wherein the distance from the outer periphery of the inside peripheral flange to the axle-hub-attachment-plate is about 3 and ⅝ths inches.

7. A wheel according to claim 5, wherein the distance from the outer periphery of the inside peripheral flange to the axle-hub-attachment-plate is about 3 and ⅝ths inches.

* * * * *

UNITED STATES PATENT AND TRADEMARK OFFICE
CERTIFICATE OF CORRECTION

PATENT NO. : 4,434,864

DATED : March 6, 1984

INVENTOR(S) : Frank V. Lupo

It is certified that error appears in the above-identified patent and that said Letters Patent is hereby corrected as shown below:

Column 1, line 48, "unles" should be "unless",
   line 60, "serive" should be "service".

Column 3, line 6, "signel" should be "single",
   line 48, "tubless" should be "tubeless".

Signed and Sealed this

Twenty-second Day of May 1984

[SEAL]

Attest:

GERALD J. MOSSINGHOFF

Attesting Officer

Commissioner of Patents and Trademarks